United States Patent Office 3,113,008
Patented Dec. 3, 1963

3,113,008
METHOD OF INCREASING ANNEALING POINT OF HIGH SILICA GLASS
Thomas H. Elmer, Corning, N.Y., assignor to Corning Glass Works, Corning, N.Y., a corporation of New York
No Drawing. Filed June 27, 1960, Ser. No. 38,745
8 Claims. (Cl. 65—31)

This invention relates to glasses of the type disclosed in Patents Nos. 2,106,744 and 2,221,709, and particularly to a method of improving the properties and usefulness of such glasses for applications wherein the glasses are subjected to high temperatures during use.

According to such patents, an article composed of a glass containing over 94% $SiO_2$ can be produced by melting and shaping a particularly easily meltable borosilicate glass, heat-treating the glass to cause it to phase separate, and extracting therefrom soluble, non-siliceous constituents of one phase by leaching to leave a highly siliceous structure retaining its original shape and having a multiplicity of intercommunicating submicroscopic pores, and thereafter consolidating the porous glass to a non-porous condition by heating. As such glasses have high annealing points (on the order of about 900°–1025° C.) and good transmittance to visible and UV light, they have been utilized as envelopes for medium-pressure, mercury arc lamps. However, the use for these and related applications has been limited by the maximum annealing point attainable therein.

The principal object of this invention is to produce glass articles which have annealing points in excess of 1100° C., preferably in excess of 1150° C., from glass compositions which are easy to melt and work into articles of the desired shape.

I have now discovered that the principal object can be achieved by an improvement in the heretofore known methods of producing glass articles disclosed in the above mentioned patents; such products being known in the trade by the generic name of "96% silica glass." My improved method comprises subjecting an article or body of such glass in the porous condition, produced by the known method of exposing suitable glass compositions to an emulsion-forming heat-treatment and thereafter dissolving the soluble phase of the glass in acid solutions, to a temperature of between 900° and 1050° C. in a surrounding atmosphere of ammonia gas for a time sufficient to allow the ammonia to react with the heated porous glass to the desired extent and thereafter exposing the thus treated porous glass body to a temperature of between 1300°–1350° C. in a nonoxidizing atmosphere to consolidate the porous glass article to the non-porous condition. My above-described method produces a glass body with an annealing point of 1165° C. whereas the annealing points of the glass bodies produced by the methods of the aforementioned patents are about 900°–1025° C. Furthermore, ammonia gas is the only gas which produces this unexpected and marked improvement in the annealing point; other gases which have heretofore been utilized to improve optical transmission of such 96% silica glass by reducing the iron contained therein and/or removing the water therefrom, such as nitrogen carbon dioxide, carbon monoxide, sulfur dioxide, helium, neon, argon, forming gas, and the like are incapable of producing annealing points in excess of about 1025° C.

While I am unable to prove the reason for the increase in the annealing point of the glass body resulting from my improved method, I believe that the method results in the incorporation of nitrogen atoms within the final glass structure and that such reaction occurs due to the thermal decomposition of the ammonia gas at the elevated temperatures involved herein, with attendant release of nascent nitrogen which can react with the glass surface before it has sufficient time to associate with a similar nitrogen atom to form a molecule of nitrogen gas. The nitrogen atoms thereby become a part of the glass network and increases its resistance to viscous flow. Of course, it requires the incorporation of a significant number of nitrogen atoms into the glass structure in order to produce the observed results, but this is readily accomplished with the present process because of the large amount of surface presented by the porous glass for a given weight of glass. Furthermore, while the ammonia atmosphere may be diluted with a substantial amount of non-oxidizing gas or gases to reduce the ammonia concentration to as little as about 5% by volume, such dilution slows the apparent reaction rate.

In practicing my invention, the article used as the initial stock material in my improved process is fabricated in the usual manner from a glass consisting essentially of $SiO_2$, $B_2O_3$, and alkali oxide; the amount of each being governed by considerations set forth in the above mentioned patents. In these glasses alumina may be present in small amounts and its presence in amounts up to 4% in glasses of low silica content located near the center of the field defined in such patents is advantageous in facilitating the subsequent leaching of the glass.

The article is subjected to a heat treatment which comprises heating the glass at a temperature between about 525° and 600° C. for a time necessary to cause the required change in structure. As a result of the heat treatment, the glass becomes more or less completely separated or formed into two phases one of which is very rich in boric oxide and alkali metal oxide and is soluble in acids and the other of which is very rich in silica and is substantially insoluble in acids. In other words, a change has taken place in the structure of the glass so that the constituents other than silica are for the most part soluble in acids and may be extracted thereby.

The previous thermal history of a glass has a bearing upon the heat treatment which may be required for best results. Articles which are relatively thick receive some heat treatment in normal working and cooling and the additional heat treatment required may be different from that required by a thinner article which was cooled more quickly during manufacture. Hence the term "heat treatment" as used herein includes heat treatment during fabrication as well as any additional heat treatment following fabrication.

In order that the leaching step may be carried out with better facility, it is desirable to etch off the surface of the glass by immersing it for a few minutes in a dilute solution of hydrofluoric acid or in a hot 5% solution of sodium hydroxide.

The article is then rinsed and immersed in dilute hydrochloric, nitric, or sulfuric acid, the temperature of the bath being held preferably at or near its boiling point to obtain maximum speed of extraction. The progress of the extraction may be observed because the interface between the extracted and unextracted portions of the glass is visible.

After the acid treatment, the glass is washed to remove all traces of the soluble constituents which have been acted on by the acid. This is best accomplished by immersing the glass for several hours in hot, acidified water so as to expose all sides of the article to the washing action. The removal of the soluble phase leaves the silica phase as a rigid structure possessing the original shape of the article, but submicroscopically porous, the pores being filled with water. The article may thereafter be dried and in general will be substantially transparent, probably because the individual pores are too small to reflect light. Articles thus produced in which the pore size is sufficiently large will have light diffusing characteristics.

While my method is applicable to porous glass bodies in general, it is particularly suitable to articles with wall thicknesses up to about 2 milimeters. While some of the advantages of this invention are produced when articles having substantially thicker walls are so treated, it appears that the ammonia gas cannot permeate completely to the center of walls substantially thicker than about 2 millimeters before it thermally decomposes to nitrogen and hydrogen gas thereby precluding the formation of nascent nitrogen in close proximity to the surface of the interior pores. However, in the case of such thicker ware, a harder, higher annealing surface layer is thereby formed by my improved process with the attendant result that the indicated annealing point of the body as a whole is substantially increased and, as in the case with thinner bodies which have been completely treated throughout their thickness, such bodies can be utilized at substantially higher temperatures than corresponding bodies which have not been so treated by ammonia gas prior to their consolidation. For instance, sheets of about 5 mm. thickness were treated with ammonia gas in the above described manner to achieve annealing points about 100° C. higher than by conventional treatment.

The term "annealing point," as recently defined by the American Society for Testing Materials, means that temperature at which glass has a viscosity of $10^{13.0}$ poises when measured by the method taught in the Jour. Am. Cer. Soc., vol. 14, pages 501–511 (1931), utilizing a rate of cooling of approximately 4° C. per minute with a fiber of approximately 0.065 centimeter in diameter.

While the porous glass body may be treated with ammonia gas and thereafter consolidated in the same furnace without removal therefrom, in many cases it is much more practical to perform the two steps in separate furnaces. In this regard, it should be pointed out that once the porous glass article has been treated with the ammonia gas it should not thereafter be exposed to air or other oxidizing atmospheres while at a temperature in excess of about 850° C. as such treatment removes the effect obtained by the ammonia process. Therefore, if it is desirable to remove the porous, ammonia-treated glass body from the furnace prior to its consolidation, the furnace and the glass body therein should be cooled to a temperature of less than 850° C. before the ammonia gas is displaced within the furnace by air or other oxidizing atmospheres.

Porous glass bodies amenable to the present process can be melted, formed to the desired shape, heat-treated and leached according to the method disclosed in the above-mentioned patents.

The preferred method of treating such porous glass bodies according to my method is illustrated by the following example.

A porous glass tube having a wall thickness of about 1.1 millimeters is placed in a conventional furnace and preheated in air to a temperature of about 750° C. The tubing is thereupon transferred to another furnace which has been preheated to 750° C. and contains an atmosphere consisting essentially of ammonia gas and its disassociation products, hydrogen and nitrogen. The tubing is thereupon heated at the furnace rate to a temperature of 950° C. and maintained at such temperature for 16 hours. During such time that the porous glass article is being treated in the ammonia atmosphere, ammonia gas is continually injected into the furnace at such a rate as to continually allow bleeding gas from the furnace atmosphere so that the thus exhausted gas contains a discernable amount of ammonia. The thus treated body is then cooled within the ammonia treated furnace until a temperature of at least 850° C. and thereupon is transferred to another furnace which has been preheated to the same temperature.

The air in the furnace is then exhausted to produce a substantial vacuum therein and the temperature is raised to the consolidation temperature of at least 1300° C. with appropriate holds or soakings of one-half hour at 900° C., and one hour each at 950° C., 1000° C., and 1050° C. The body is finally consolidated by holding it at the preferred consolidation temperature of 1350° C. for about one-half hour.

The annealing point of the resulting glass tube was measured and determined to be 1165° C.

The furnaces utilized for the heating steps of my process are of conventional type. Thus, the glass may be heated at temperatures of up to about 1050° C. in electric furnaces utilizing wire resistance heating elements of suitable metals such as nichrome. The consolidation of the porous glass must be carried out in a furnace capable of maintaining temperatures of at least 1300° C. and, hence, a suitable furnace for such purpose comprises the so-called Globar-type utilizing silicon carbide or molybdenum disilicide heating elements.

While the ultimate consolidation of the porous glass is preferably carried out in a vacuum, as it is more rapid than other consolidation procedures, such consolidation may also be carried out by similar processes wherein anhydrous, nonoxidizing atmospheres such as nitrogen, carbon monoxide, carbon dioxide, helium, neon, argon, forming gas, and the like are utilized in place of the vacuum. These gases require a somewhat longer heating process but they may be accomplished at atmospheric pressures.

What is claimed is:

1. The method of improving the annealing point of a 96% silica glass article made by consolidating a glass article of high silica content having throughout its mass a multiplicity of submicroscopic intercommunicating pores which includes heating the porous article to a temperature of 900°–1050° C. in a non-oxidizing atmosphere containing at least about 5% by volume of ammonia gas and its dissociation products and thereafter consolidating the thus treated glass in a non-oxidizing atmosphere at a temperature of 1300° C.–1350° C.

2. The method of improving the annealing point of a 96% silica glass article made by consolidating a glass article of high silica content having a wall thickness of less than about 2 millimeters and having throughout its mass a multiplicity of submicroscopic intercommunicating pores which includes heating the porous article to a temperature of 900°–1050° C. in a non-oxidizing atmosphere containing at least about 5% by volume of ammonia gas and its dissociation products for a sufficient time for the ammonia gas to permeate the entire wall thickness and thereafter consolidating the porous glass body in a non-oxidizing atmosphere at a temperature between 1300° C. and 1350° C.

3. The method of increasing the annealing point of a 96% silica glass article made by consolidating a glass article of high silica content having throughout its mass a multiplicity of intercommunicating pores which includes heating the porous article to a temperature between 900° C. and 1050° C. in a non-oxidizing atmosphere containing at least about 5% by volume of ammonia gas and its dissociation products for a sufficient time for the ammonia gas to permeate a portion of the porous body and thereafter consolidating the porous glass body by exposing it in a non-oxidizing atmosphere to a temperature of 1300°–1350° C.

4. The method of claim 1 wherein the non-oxidizing atmosphere in which the treated glass is consolidated comprises a substantial vacuum.

5. In the method of making a 96% silica glass article which comprises melting and shaping a borosilicate glass, heat-treating the glass to cause it to phase separate and extracting therefrom soluble, non-siliceous constituents of one phase by leaching to leave a highly siliceous structure retaining its original shape and having a multiplicity of intercommunicating submicroscopic pores and thereafter consolidating the porous glass to a non-porous condition by heating, the improvement which comprises heating the article of such glass in the porous condition to a temperature of 900°–1050° C. in a non-oxidizing atmosphere containing at least about 5% by volume of ammonia gas and its dissociation products and thereafter consolidating the treated glass in a non-oxidizing atmosphere at a temperature of 1300°–1350° C.

6. In the method of making a 96% silica glass article which comprises melting and shaping a borosilicate glass, heat-treating the glass to cause it to phase separate and extracting therefrom soluble, non-siliceous constituents of one phase by leaching to leave a highly siliceous structure retaining its original shape and having a multiplicity of intercommunicating submicroscopic pores and thereafter consolidating the porous glass to a non-porous condition by heating, the improvement which comprises shaping the glass to an article having a wall thickness of less than about 2 millimeters, heating the article of such glass in the porous condition to a temperature of 900°–1050° C. in a non-oxidizing atmosphere containing at least about 5% by volume of ammonia gas and its dissociation products for a sufficient time for the ammonia gas to permeate the entire wall thickness and thereafter consolidating the treated glass in a non-oxidizing atmosphere at a temperature of 1300°–1350° C.

7. In the method of making a 96% silica glass article which comprises melting and shaping a borisilicate glass, heat-treating the glass to cause it to phase separate and extracting therefrom soluble, non-siliceous constituents of one phase by leaching to leave a highly siliceous structure retaining its original shape and having a multiplicity of intercommunicating submicroscopic pores and thereafter consolidating the porous glass to a non-porous condition by heating, the improvement which comprises heating the article of such glass in the porous condition to a temperature of 900°–1050° C. in a non-oxidizing atmosphere containing at least about 5% by volume of ammonia gas and its dissociation products for a sufficient time for the ammonia gas to permeate a portion of the porous body and thereafter consolidating the treated glass in a non-oxidizing atmosphere at a temperature of 1300°–1350° C.

8. The method of claim 5 wherein the non-oxidizing atmosphere in which the treated glass is consolidated comprises a substantial vacuum.

References Cited in the file of this patent

UNITED STATES PATENTS

| | | |
|---|---|---|
| 2,215,039 | Hood et al. | Sept. 17, 1940 |
| 2,286,275 | Hood et al. | June 16, 1942 |
| 2,303,756 | Nordberg et al. | Dec. 1, 1942 |
| 2,612,726 | Nordberg | Oct. 7, 1952 |
| 2,982,053 | Elmer | May 2, 1961 |